(12) United States Patent
Willis et al.

(10) Patent No.: US 10,019,562 B2
(45) Date of Patent: Jul. 10, 2018

(54) BIOMETRIC AUTHENTICATION MATCHING USING GRIP DETECTION

(71) Applicant: Motorola Mobility LLC, Chicago, IL (US)

(72) Inventors: Lawrence A Willis, Dubuque, IA (US); Justin Eltoft, Pleasant Prairie, WI (US); Jiri Slaby, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/802,618

(22) Filed: Jul. 17, 2015

(65) Prior Publication Data

US 2017/0017783 A1    Jan. 19, 2017

(51) Int. Cl.
*G06F 7/04* (2006.01)
*G06F 21/32* (2013.01)
*G06K 9/62* (2006.01)
*G06K 9/00* (2006.01)

(52) U.S. Cl.
CPC ......... *G06F 21/32* (2013.01); *G06K 9/00013* (2013.01); *G06K 9/00892* (2013.01); *G06K 9/6202* (2013.01)

(58) Field of Classification Search
CPC ...................................... G06F 21/32
USPC .......................................................... 726/18
See application file for complete search history.

(56) References Cited

U.S. PATENT DOCUMENTS

| | | | | |
|---|---|---|---|---|
| 5,603,179 A | * | 2/1997 | Adams | F41A 17/066 42/70.06 |
| 8,724,861 B1 | * | 5/2014 | Sun | G06K 9/00013 345/158 |
| 2004/0069846 A1 | * | 4/2004 | Lambert | G06F 21/32 235/382 |
| 2011/0317882 A1 | * | 12/2011 | Muazam | G06K 9/00087 382/117 |
| 2013/0283057 A1 | * | 10/2013 | Hama | G06K 9/00885 713/186 |
| 2014/0219520 A1 | * | 8/2014 | Myers | G06K 9/6255 382/124 |
| 2014/0317722 A1 | * | 10/2014 | Tartz | G06F 3/011 726/19 |
| 2014/0354401 A1 | * | 12/2014 | Soni | G06F 21/32 340/5.52 |
| 2015/0324570 A1 | * | 11/2015 | Lee | G06K 9/3208 382/124 |

* cited by examiner

*Primary Examiner* — Peter C Shaw

(57) ABSTRACT

In embodiments of an electronic device having a biometric authentication system and grip detection sensor, an authentication circuit is coupled to the biometric authentication sensor and grip detection sensor. The biometric authentication sensor is configured to receive a biometric input sample. The grip detection sensor is configured to identify an orientation of a hand of a user relative to the biometric authentication sensor. The authentication circuit determines a priority of multiple biometric templates based on the orientation and authenticates the biometric input sample based on the priority of the multiple biometric templates.

20 Claims, 3 Drawing Sheets

BIOMETRIC AUTHENTICATION MATCHING USING GRIP DETECTION

BACKGROUND

Portable devices, such as mobile phones, tablet devices, digital cameras, and other types of computing and electronic devices can include a biometric authentication sensor that a user can simply touch with a digit, such as a thumb or finger, to access a device. A biometric authentication sensor is typically positioned offset relative to the integrated display of an electronic device, and the display lens that covers the display extends over the sensor area offset from the display. However, the display lens is designed with an opening to accommodate access to the biometric authentication sensor so that a user can place a digit, such as a thumb or finger, on the sensor, which then images the biometric input sample for user authentication.

A biometric authentication sensor needs to first be activated to image the biometric input sample, such as requiring the user to initiate a device on-button, or other type of activation of the device, which then initiates activation of the biometric authentication sensor. This type of sensor activation can include "wake on finger touch" to "wake-on" the biometric authentication sensor, which requires the sensor to always be in a powered or semi-powered state monitoring for a sensor touch. This can contribute to drain the battery or other power source of a portable device.

When a user registers multiple biometric input samples in a biometric authentication system, the matching system may take longer to acquire a match if it searches multiple stored biometric templates. Additionally, the matching system can take longer if the user digit, such as a finger or thumb, is placed on the sensor in a position or orientation that is different from that used when it was initially enrolled. If the system can determine the appropriate biometric template to match, as well as its expected orientation, then the matching process will be efficient and optimal.

BRIEF DESCRIPTION OF THE DRAWINGS

Embodiments of a biometric authentication sensor under a non-conductive surface with wake-on are described with reference to the following Figures. The same numbers may be used throughout to reference like features and components that are shown in the Figures.

DETAILED DESCRIPTION

There is described an electronic device, method, and system for using grip detection technology to determine the likelihood that a user will perform a device functions with one hand, i.e., the left hand or the right hand. For one handed operation, the user may generally utilize the user's right thumb or left thumb to perform authentication. If the grip detection technology determines that the user is using the user's left hand or right hand, the matching subsystem of the biometric authentication system is notified. The notification includes the expected object or digit, such as the left or right thumb, and its probable orientation relative to a default position of the biometric authentication sensor, such as 45 degrees, 90 degrees or 135 degrees. The matching process of the biometric authentication system may be efficient as a result, thus minimizing the time needed to perform the matching process.

An aspect of the electronic device comprises a biometric authentication sensor, a grip detection sensor, and an authentication circuit coupled to the biometric authentication sensor and grip detection sensor. The biometric authentication sensor is configured to receive a biometric input sample. The grip detection sensor is configured to identify an orientation of a hand of a user relative to the biometric authentication sensor. The authentication circuit determines a priority of a plurality of biometric templates based on the orientation and authenticates the biometric input sample based on the priority of the plurality of biometric templates.

An aspect of the operation of the biometric authentication system is initiated by a grip detection sensor identifying an orientation of a hand of a user relative to the biometric authentication sensor. A priority of a plurality of biometric templates is determined based on the orientation. The biometric input sample is authenticated based on the priority of the plurality of biometric templates.

While features and concepts of a biometric authentication sensor may be implemented in any number of different devices, systems, environments, and/or configurations, embodiments of a biometric authentication sensor are described in the context of the following example devices, systems, and methods.

Figure 1:
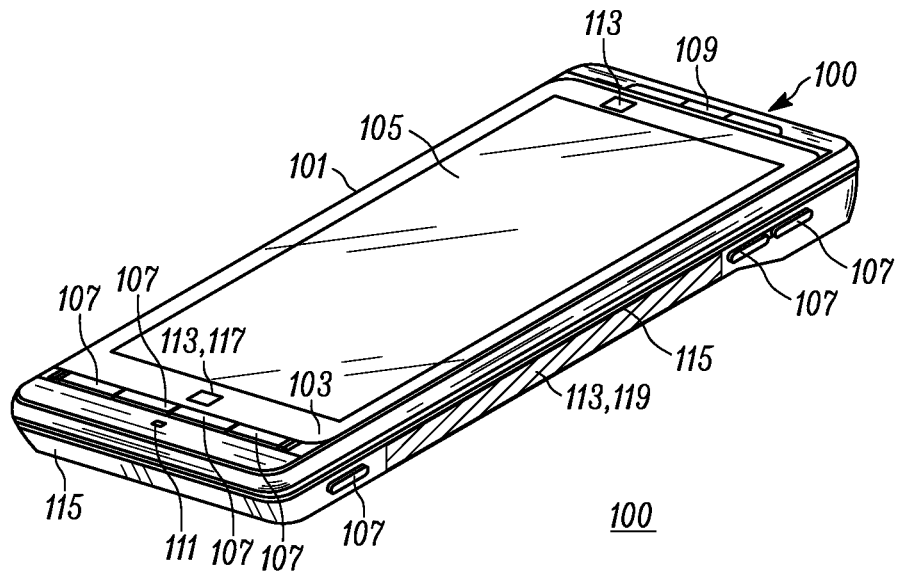
FIG. 1 illustrates an example electronic device having a biometric authentication sensor and grip sensors in accordance with the present invention.

Referring to FIG. 1, there is illustrated a perspective view of an example electronic device 100. Examples of the electronic device 100 include, but are not limited to, computers, wireless devices, tablet computing devices, personal digital assistants, personal navigation devices, touch screen input device, touch or pen-based input devices, portable video and/or audio players, and the like. It is to be understood that the electronic device 100 may take the form of a variety of form factors, such as, but not limited to, bar, tablet, flip/clam, slider, rotator, and wearable form factors.

For one embodiment, the electronic device 100 has a housing 101 comprising a front surface 103 which includes a visible display 105 and a user interface. For example, the user interface may be a touch screen including a touch-sensitive surface that overlays the display 105. For another embodiment, the user interface or touch screen of the electronic device 100 may include a touch-sensitive surface supported by the housing 101 that does not overlay any type of display. For yet another embodiment, the user interface of the electronic device 100 may include one or more input keys 107. Examples of the input key or keys 107 include, but are not limited to, keys of an alpha or numeric keypad or keyboard, a physical keys, touch-sensitive surfaces, mechanical surfaces, multipoint directional keys and side buttons or keys 107. The electronic device 100 may also comprise apertures 109, 111 for audio output and input at the surface. It is to be understood that the electronic device 100 may include a variety of different combination of displays and interfaces.

The electronic device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101.

The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself.

As shown in FIG. 1, the example electronic device 100 may have embodiments with a biometric authentication sensor 117 and grip detection sensor 119 may be implemented. In this example, the electronic device 100 implements components and features of a biometric authentication sensor 117 that can be utilized by a user of the electronic device for authentication to access and use the device. The biometric authentication sensor 117 may be, for example, a fingerprint sensor, a proximity sensor, and a touch sensor.

A user may pick up the electronic device 100 and place a digit, such as a thumb or finger, over the location of the biometric authentication sensor 117 for authentication to use the device. The biometric authentication sensor 117 may generate a biometric input sample image of a biometric input sample, and an authentication application of the electronic device 100 may then authenticate the user based on the biometric input sample image.

The authentication application may be implemented as a software application or module, such as executable software instructions (e.g., computer-executable instructions) that are executable with a processor of the electronic device 100. Further, the authentication application can be stored on computer-readable storage memory (e.g., a memory device), such as any suitable memory device or electronic data storage implemented in the electronic device. The authentication application may compare biometric templates associated with potential biometric input samples, stored in computer-readable storage memory, with the biometric input samples or biometric input sample images. Additionally, the electronic device 100 may be implemented with various components, such as a processing system and memory, and any number and combination of various components as further described with reference to the example device shown in FIG. 4.

Figure 2:
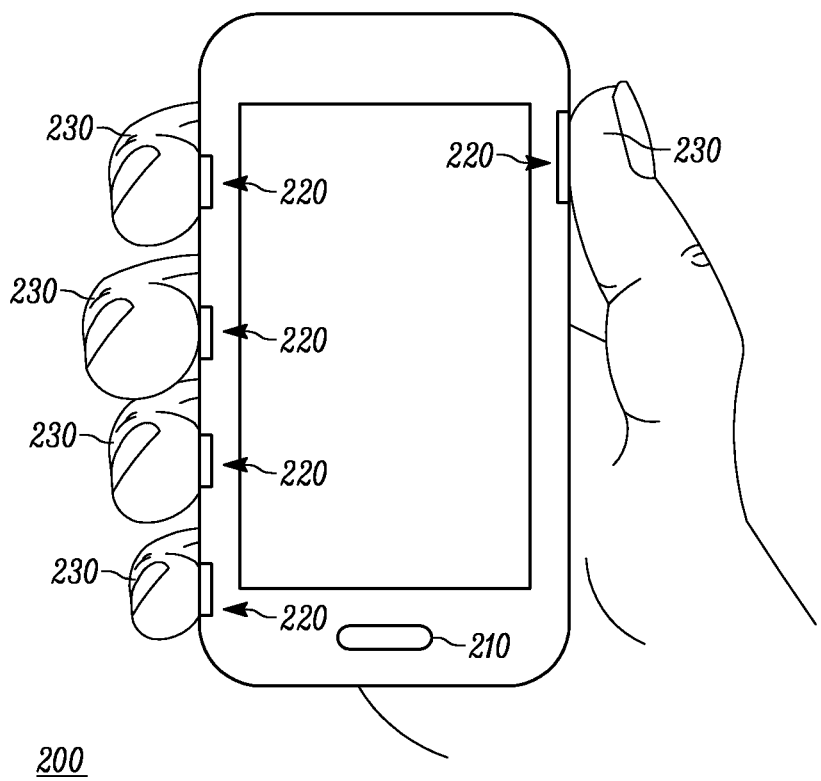
FIG. 2 illustrates an example embodiment of an electronic device having a biometric authentication sensor and grip sensors positioned in a user's hand.

Referring to FIG. 2, there is shown a planar outline view of an example electronic device 200, in which most components of the device are not shown. For the embodiment represented in FIG. 2, the electronic device comprises a biometric authentication sensor 210 configured to receive a biometric input sample, and one or more grip detection sensors 220 configured to identify an orientation of a hand or, more particularly, the objects or digits 230 of a user's hand relative to the biometric authentication sensor. The electronic device 200 or, more particularly, an authentication circuit coupled to the biometric authentication sensor and grip detection sensor, determines a priority of multiple biometric templates based on the orientation and authenticates the biometric input sample based on the priority of the biometric templates. The authentication circuit authenticates the biometric input sample in response to identifying a match between the biometric input sample and a particular template of the biometric templates. For example, the biometric templates may be fingerprints stored in a memory portion of the electronic device 200, and the biometric input sample may be a fingerprint detected by the biometric authentication sensor 210. The biometric templates may correspond to enrolled input samples of at least two digits of the user. The biometric input sample is received in response to a digit of the user being in proximity to the biometric authentication sensor.

The grip detection technology determines the likelihood that a user will perform a device functions with one hand, i.e., the left hand or the right hand. For one handed operation, the user may generally utilize the user's right thumb or left thumb to perform authentication. If the grip detection technology determines that the user is using the user's left hand or right hand, the matching subsystem of the biometric authentication system is notified. For some embodiments, the grip detection sensor may identify a one-handed operation of the user, and the authentication circuit may prioritize at least one thumb based biometric template ahead of at least one non-thumb based biometric template. For other embodiments, the grip detection sensor may identify a one-handed operation of the user, and the authentication circuit may prioritize at least one side oriented biometric template ahead of at least one non-side oriented biometric template. For still other embodiments, the side oriented biometric template(s) may be associated with a first orientation that is substantially perpendicular to a second orientation associated with the non-side oriented biometric template(s). For yet other embodiments, the authentication circuit may associate a first biometric template of the plurality of biometric templates with a left-hand orientation and a second biometric template of the plurality of biometric templates with a right-hand orientation, and either the first biometric template or the second biometric template may be prioritized ahead of one or more other biometric templates based on the orientation.

Figure 3:
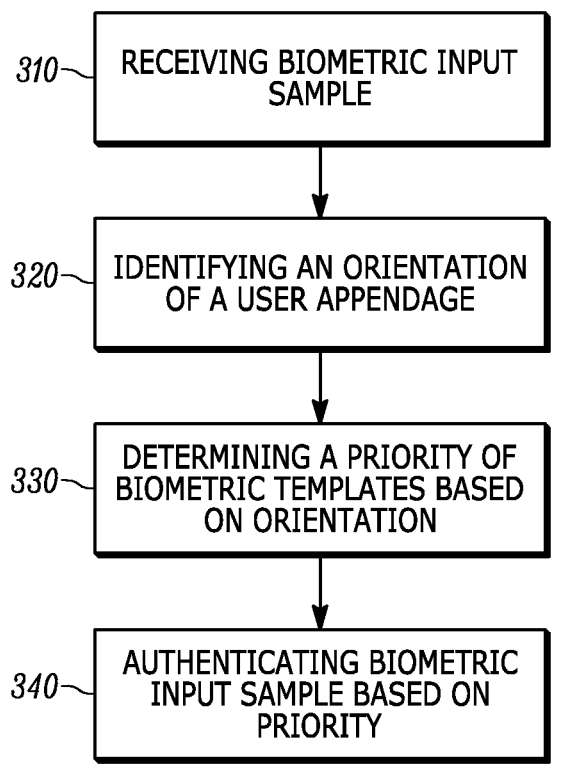
FIG. 3 illustrates an example operation of an electronic device in accordance with the present invention.

Referring to FIG. 3, there is shown an example operation of an electronic device in accordance with the present invention. The electronic device receives a biometric input sample at a biometric authentication sensor of the device, at step 310. For example, receiving a biometric input sample may include detecting a digit of the user in proximity to the biometric authentication sensor. The grip detection sensor then identifies an orientation of a hand of a user relative to the biometric authentication sensor, at step 320. Next, a priority of multiple biometric templates is determined based on the orientation of the user's hand relative to the biometric authentication sensor, at step 330. For example, the biometric templates may correspond to registered input samples of at least two digits of the user. The biometric input sample is then authenticated based on the determined priority of the biometric templates, at step 340. For example, authenticating the biometric input sample may include identifying a match between the biometric input sample and a particular template of the plurality of biometric templates.

The identification of the orientation of a user's hand and the determination of the priority of the biometric templates may be accomplished in a variety of ways. For some embodiments, a one-handed operation of the user may be identified, and at least one thumb based biometric template may be prioritized ahead of at least one non-thumb based biometric template. For other embodiments, a one-handed operation of the user may be identified, and at least one side oriented biometric template may be prioritized ahead of at least one non-side oriented biometric template. For example, the side oriented biometric template may be associated with a first orientation that is substantially perpendicular to a second orientation associated with the non-side oriented biometric template. For yet other embodiments, a first biometric template of the multiple biometric templates may associated with a left-hand orientation, and a second biometric template of the multiple biometric templates may be associated with a right-hand orientation, in which either the first biometric template or the second biometric template may be prioritized ahead of at least one other biometric template based on the orientation.

Figure 4:
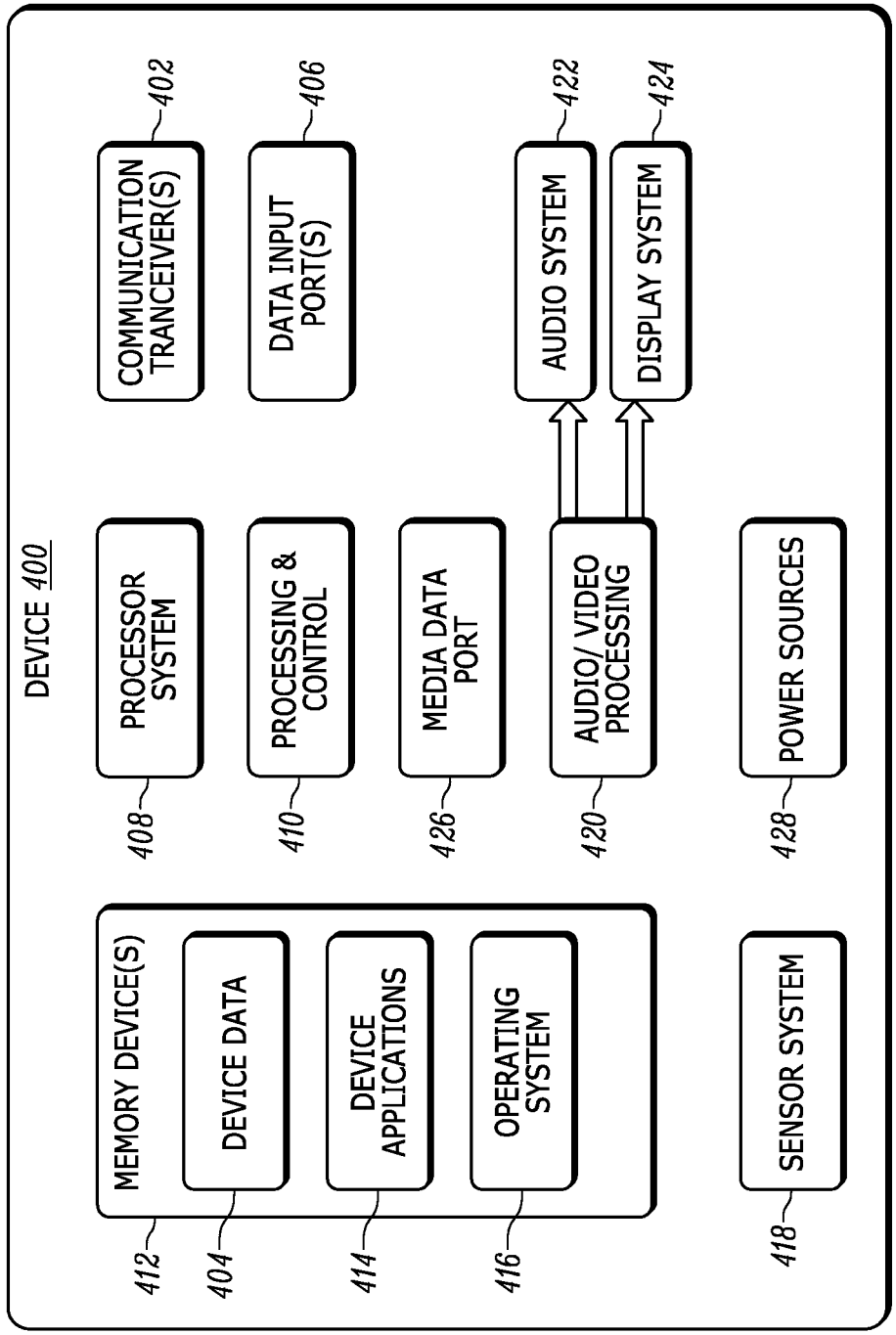
FIG. 4 illustrates various components of an example electronic device in accordance with the present invention.

Referring to FIG. 4, there are illustrated various components of an example device 400 in which embodiments of biometric authentication sensor under a non-conductive surface with wake-on may be implemented. The example device 400 may be implemented as any of the electronic devices described with reference to the previous figures, such as any type of client device, mobile phone, tablet, computing, communication, entertainment, gaming, media playback, and/or other type of device. For example, the electronic device 100 shown in FIG. 1 may be implemented as the example device 400.

The device 400 includes communication transceivers 402 that enable wired and/or wireless communication of device data 404 with other devices. Additionally, the device data may include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 400 may also include one or more data input ports 406 via which any type of data, media content, and/or inputs may be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which may include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device may be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus may include any one or combination of different bus structures and architectures, as well as control and data lines.

The device 400 also includes computer-readable storage memory 412 that enable data storage, such as data storage devices that may be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory may include various implementations of random access memory (RAM), read-only memory (ROM), flash memory, and other types of storage media in various memory device configurations. The device 400 may also include a mass storage media device.

The computer-readable storage memory 412 provides data storage mechanisms to store the device data 404, other types of information and/or data, and various device applications 414 (e.g., software applications). For example, an operating system 416 may be maintained as software instructions with a memory device and executed by the processing system 408. The device applications may also include a device manager, such as any form of a control application, software application, signal-processing and control module, code that is native to a particular device, a hardware abstraction layer for a particular device, and so on. In this example, the device 400 includes a sensor system 418 that implements embodiments of a biometric authentication sensor under a non-conductive surface with wake-on, and may be implemented with hardware components and/or in software, such as when the device 400 is implemented as the electronic device 100 described with reference to FIGS. 1-4. An example of the sensor system 418 is the biometric authentication sensor 102, the activation sensor or sensors 120, and the authentication application 114 that are implemented by the electronic device 100.

The device 400 also includes an audio and/or video processing system 420 that generates audio data for an audio system 422 and/or generates display data for a display system 424. The audio system and/or the display system may include any devices that process, display, and/or otherwise render audio, video, display, and/or image data. Display data and audio signals may be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 426. In implementations, the audio system and/or the display system are integrated components of the example device. Alternatively, the audio system and/or the display system are external, peripheral components to the example device.

The device 400 may also include one or more power sources 428, such as when the device is implemented as an electronic device. The power sources may include a charging and/or power system, and may be implemented as a flexible strip battery, a rechargeable battery, a charged super-capacitor, and/or any other type of active or passive power source.

Although embodiments of a biometric authentication sensor under a non-conductive surface with wake-on have been described in language specific to features and/or methods, the subject of the appended claims is not necessarily limited to the specific features or methods described. Rather, the specific features and methods are disclosed as example implementations of a biometric authentication sensor under a non-conductive surface with wake-on, and other equivalent features and methods are intended to be within the scope of the appended claims. Further, various different embodiments are described and it is to be appreciated that each described embodiment may be implemented independently or in connection with one or more other described embodiments.

The invention claimed is:

1. An electronic device configured to authenticate a user and grant access to the device, the device comprising:

a biometric authentication sensor located on a first surface of the device, wherein the biometric authentication sensor receives a biometric input sample;
a grip detection sensor located on a second surface separate from the biometric authentication sensor, wherein the grip detection sensor identifies an angular orientation of a hand of a user relative to a default position of the biometric authentication sensor; and
an authentication circuit coupled to the biometric authentication sensor and grip detection sensor, wherein a priority of a plurality of biometric templates is system-selected by the authentication circuit determining the priority of the plurality of biometric templates based on the angular orientation of the hand of the user identified by the grip detection sensor, and authenticating the biometric input sample received by the biometric authentication sensor, based on the priority of the plurality of biometric templates.

2. The electronic device of claim 1, wherein the biometric input sample is received in response to a digit of the user being in proximity to the biometric authentication sensor.

3. The electronic device of claim 1, wherein the plurality of biometric templates corresponds to enrolled input samples of at least two digits of the user.

4. The electronic device of claim 1, wherein the authentication circuit authenticates the biometric input sample in response to identifying a match between the biometric input sample and a particular template of the plurality of biometric templates.

5. The electronic device of claim 1, wherein:
the grip detection sensor identifies a one-handed operation of the user, and
the authentication circuit prioritizes at least one thumb based biometric template ahead of at least one non-thumb based biometric template.

6. The electronic device of claim 1, wherein:
the grip detection sensor identifies a one-handed operation of the user, and
the authentication circuit prioritizes at least one biometric template ahead of at least one other biometric template based on said one-handed operation.

7. The electronic device of claim 6, wherein the at least one other biometric template is associated with a first orientation that is different from a second orientation associated with the at least one other biometric template.

8. The electronic device of claim 1, wherein:
the authentication circuit associates a first biometric template of the plurality of biometric templates with a left-hand orientation and a second biometric template of the plurality of biometric templates with a right-hand orientation, and
one of either the first biometric template or the second biometric template is prioritized ahead of at least one other biometric template based on the orientation.

9. A method of an electronic device configured to authenticate a user and grant access to the device, the method comprising:
receiving a biometric input sample at a biometric authentication sensor located on a first surface of the device;
identifying, at a grip detection sensor located on a second surface separate from the biometric authentication sensor, an angular orientation of a hand of a user relative to a default position of the biometric authentication sensor;
determining, at an authentication circuit, a priority of a plurality of biometric templates based on the angular orientation of the hand of the user, wherein said determining is system-selected; and
authenticating the biometric input sample based on the priority of the plurality of biometric templates.

10. The method of claim 9, wherein receiving a biometric input sample includes detecting a digit of the user in proximity to the biometric authentication sensor.

11. The method of claim 9, wherein the plurality of biometric templates corresponds to registered input samples of at least two digits of the user.

12. The method of claim 9, wherein authenticating the biometric input sample includes identifying a match between the biometric input sample and a particular template of the plurality of biometric templates.

13. The method of claim 9, wherein:
identifying an orientation of a hand of a user includes identifying a one-handed operation of the user, and
determining a priority of a plurality of biometric templates includes prioritizing at least one thumb based biometric template ahead of at least one non-thumb based biometric template.

14. The method of claim 9, wherein:
identifying an orientation of a hand of a user includes identifying a one-handed operation of the user, and
determining a priority of a plurality of biometric templates includes prioritizing at least one biometric template ahead of at least one other biometric template.

15. The method of claim 14, wherein the at least one biometric template is associated with a first orientation that is different from a second orientation associated with the at least one biometric template.

16. The method of claim 9, further comprising:
associating a first biometric template of the plurality of biometric templates with a left-hand orientation; and
associating a second biometric template of the plurality of biometric templates with a right-hand orientation,
wherein determining a priority of a plurality of biometric templates includes prioritizing one of either the first biometric template or the second biometric template is prioritized ahead of at least one other biometric template based on the orientation.

17. A mobile phone comprising:
one or more communication transceivers that enable communication of data with other devices;
a biometric authentication sensor located on a first surface of the device, wherein the biometric authentication sensor receives a biometric input sample;
a grip detection sensor located on a second surface separate from the biometric authentication sensor, wherein the grip detection sensor identifies an angular orientation of a hand of a user relative to a default position of the biometric authentication sensor; and
an authentication circuit coupled to the biometric authentication sensor and grip detection sensor, wherein a priority of a plurality of biometric templates is system-selected by the authentication circuit determining the priority of the plurality of biometric templates based on the angular orientation of the hand of the user identified by the grip detection sensor, and authenticating the biometric input sample received by the biometric authentication sensor, based on the priority of the plurality of biometric templates.

18. The mobile phone of claim 17, wherein the biometric input sample is received in response to a digit of the user being in proximity to the biometric authentication sensor.

19. The mobile phone of claim 17, wherein the plurality of biometric templates corresponds to enrolled input samples of at least two digits of the user.

20. The mobile phone of claim 17, wherein the authentication circuit authenticates the biometric input sample in response to identifying a match between the biometric input sample and a particular template of the plurality of biometric templates.

* * * * *